United States Patent [19]

Vysotsky

[11] Patent Number: 5,664,058

[45] Date of Patent: Sep. 2, 1997

[54] METHOD OF TRAINING A SPEAKER-DEPENDENT SPEECH RECOGNIZER WITH AUTOMATED SUPERVISION OF TRAINING SUFFICIENCY

[75] Inventor: George Vysotsky, Riverdale, N.Y.

[73] Assignee: NYNEX Science & Technology, White Plains, N.Y.

[21] Appl. No.: 60,954

[22] Filed: May 12, 1993

[51] Int. Cl.$^6$ .................................................. G10L 5/06
[52] U.S. Cl. ..................... 704/243; 704/238; 704/239; 704/245
[58] Field of Search ................ 395/2.4, 2.45–2.48, 395/2.52–2.59, 2.6–2.66, 2.47, 2.54; 381/42–43

[56] References Cited

U.S. PATENT DOCUMENTS

| Re. 31,188 | 3/1983 | Pirz et al. | 395/2.61 |
|---|---|---|---|
| 4,461,023 | 7/1984 | Katayama | 395/2.61 |
| 4,751,737 | 6/1988 | Gerson et al. | 395/2.52 |
| 4,780,906 | 10/1988 | Rajasekaran et al. | 395/2.6 |
| 4,783,804 | 11/1988 | Juang et al. | 395/2.54 |
| 4,783,808 | 11/1988 | Doddington et al. | 395/2.69 |
| 5,218,668 | 6/1993 | Higgins et al. | 395/2.09 |
| 5,359,695 | 10/1994 | Ohara et al. | 395/2.44 |
| 5,428,707 | 6/1995 | Gould et al. | 395/2.4 |

OTHER PUBLICATIONS

Thomas W. Parsons, Voice and Speech Processing, McGraw–Hill, pp. 189–190 1987.

*Primary Examiner*—Allen R. MacDonald
*Assistant Examiner*—Tálivaldis Ivars Šmits
*Attorney, Agent, or Firm*—Anthoney C. Coles; Loren C. Swingle

[57] ABSTRACT

To train a speech recognizer, a new voice message (one or a few isolated words), after being spoken by a user, is converted into a token. The token is then compared with a plurality of templates stored in the recognizer and a recognition score is obtained each time. The templates previously stored in the recognizer include templates for previously trained voice messages and one or more previously formed templates of the new voice message. Three tests are applied to the recognition scores to determine if the token and one of the previously formed templates of the new voice message can become paradigm templates, if the new voice message is too close in pronunciation to a voice message the recognizer has been previously trained to recognize, or if the user should repeat the new voice message to form another token. This training procedure provides a certain level of automatic control over the training process of a speaker dependent speech recognizer in an otherwise unsupervised environment. It prevents a user from adding a new voice message which is similar to a voice message the recognizer has previously been trained to recognize and insures a consistent pronunciation for all templates corresponding to the same voice message.

10 Claims, 5 Drawing Sheets

METHOD OF TRAINING A SPEAKER-DEPENDENT SPEECH RECOGNIZER WITH AUTOMATED SUPERVISION OF TRAINING SUFFICIENCY

FIELD OF THE INVENTION

The present invention relates to a method for training a speaker dependent speech recognizer. More particularly, the invention relates to a method for the unsupervised intelligent training of a speaker dependent, isolated word speech recognizer.

BACKGROUND OF THE INVENTION

Speech recognizers and speech recognition systems and methods are known and have been used in a variety of applications. One application is a state of the art telephone network which offers services based upon speech interaction between a telephone subscriber and the telephone network.

In such a telephone network, speech responses by the subscriber are used to directly invoke system operations which previously required key or dial entry. An example of such a service is speech activated auto-dialing.

In this type of dialing, a subscriber is able to access a speech server coupled to a central office switch of the telephone network. The speech server is in turn able to recognize a voice message spoken by the subscriber. A telephone number associated with the recognized message is then transmitted by the speech server to the central office switch. The central office switch then proceeds to interconnect the subscriber with the location of the spoken telephone number, as if the telephone number had been keyed or dialed in conventional fashion by the subscriber.

An integral part of the speech server is a speech recognizer used to recognize a voice message of the subscriber. In a particular application of this invention, the speech recognizer operates on PCM (Pulse Code Modulation) digital signals—a standard for digital telephony representation of a voice message—which are formed from voice samples derived from the voice message. As used herein, the term voice message refers to a single isolated word or a short utterance (e.g., two or three words).

In this type of application, a speech recognizer is usually required to recognize only a limited number of words or voice messages from each subscriber. The recognizer is in most cases initially trained based on repeated entries by the subscriber of the voice messages which are desired to be later recognized. The PCM digital signals representing the samples of a voice message are converted to a linear digital representation of speech and are processed by certain known DSP (Digital Signal Processing) algorithms. As a result of DSP, a "template" or model is developed which is indicative of the corresponding voice message. As used herein, the term "template" refers to a model formed from any features obtained through any known DSP algorithms. Usually, two or more templates for each voice message to be recognized are stored by the speech recognizer.

During recognition, inputted PCM speech undergoes the same conversion and processing as in the training mode and results in a so-called "token" of the inputted utterance (or voice message). As used herein, the term "token" refers to a multi-dimensional feature vector resulting from any kind of DSP and feature extraction algorithms. The token is then compared with the previously stored templates and when a sufficient match is realized, the voice message is recognized as that indicated by the matched template. This completes the recognition process.

One issue of concern with respect to conventional speaker dependent speech recognizers is the training process. A speaker dependent speech recognizer of the type described above delivers to a user only its ability to be trained for the subsequent recognition of voice messages selected by the user. A high quality of training is a necessary condition for a desirable recognition accuracy when the recognizer is subsequently used for recognition.

In general, the training of a speech recognizer to recognize a particular voice message is accomplished by a training algorithm incorporated in the speech recognizer. The amount of training data received from a user to train a speech recognizer so that a particular voice message can be subsequently recognized depends on how many times the user is required to repeat a voice message before the voice message becomes a trained voice message. This number of repetitions is usually a compromise between the desire to have as many repetitions as necessary for reliable training and the requirement to make training a quick and easy procedure for the user. In general, it is not desirable to leave the training data utilized by the training algorithm, e.g., the content or quality of speech supplied for training voice messages, solely to the discretion of the user. Rather, it is advantageous for the training data required from a user to be determined to obtain a high quality of training. It is a shortcoming of currently available training algorithms for speaker dependent, isolated word speech recognizers that the training usually takes place in an unsupervised environment so that only the user has control over the training data used to train the recognizer to recognize a particular voice message.

There are two problems which significantly affect the quality of training, and therefore, affect the subsequent recognition accuracy. One problem is the confusability of similar sounding voice messages that have different meanings. This naturally presents problems during subsequent recognition. A second problem arises when significantly different pronunciations are used by the user for the same voice message. When the training algorithm leaves the training data too much within the user's control, these problems are often not properly accounted for in the training process.

In particular, a training algorithm will often require a user to make several (e.g., two) templates for each voice message to be recognized. When the user is in control of the training process, the user (who does not fully appreciate how the recognition algorithms work) will often use slightly different wording or different pronunciations for the same voice message. For example, in an application where a phone call is activated by a voice message, the user will make one template corresponding to "call mom" and the second template corresponding to "call mother". When two templates are formed in this manner during training, there will be problems in the subsequent recognition process. Each of these utterances will be represented by one template only and a high level of recognition accuracy cannot be guaranteed.

In view of the foregoing, it is an object of the invention to provide a training process or algorithm for a speech recognizer, in particular a speaker dependent isolated word speech recognizer. It is a further object of the invention to provide a training process or algorithm which introduces a certain level of control over the training so that complete discretion is not left to the user. More specifically, it is an object of the invention to provide a training process for a speaker dependent isolated word speech recognizer which (a) prevents a user from adding a new voice message to the voice messages which can be recognized when the new voice message is identical or very similar to a voice message which can already be recognized, and (b) prevents a user from using different wordings when training a voice message with a particular meaning and requires a substantially consistent pronunciation for the formation of different templates corresponding to the same voice message.

SUMMARY OF THE INVENTION

In accordance with the invention, to train a speech recognizer to recognize a new voice message, the new voice message, after being spoken by a user, is converted into a token—a multi-dimensional feature vector resulting from any kind of DSP and feature extraction algorithms. The token is then compared with a plurality of templates or models stored in the recognizer and a recognition score is obtained for each of the templates. The templates may be formed from any features obtained through any known DSP algorithm. The templates previously stored in the recognizer include templates corresponding to voice messages the recognizer has previously been trained to recognize and one or more previously formed templates of the new voice message. Three tests are applied to the recognition scores to determine: (a) if the token and one of the previously formed templates of the new voice message can become templates of a voice message now recognized by the recognizer, (b) if the new voice message is too close in pronunciation to a voice message the recognizer has been previously trained to recognize, or (c) if the user should repeat the new voice message to form another token.

Considering that a "score" resulting from the matching process depicts a difference measured between the token and template (a smaller score means better matching), the three tests may be summarized as follows.

The first test is considered to be passed if the best of the recognition scores is greater than a first predetermined threshold.

The second test is considered to be passed if the difference between the best recognition score with respect to the templates of voice messages the recognizer has been previously trained to recognize and the best of the recognition scores with respect to the one or more previously formed templates of the new voice message is greater than a second predetermined threshold.

The third test is considered passed if the best of the recognition scores with respect to the one or more previously formed templates of the new voice message is smaller than a third predetermined threshold.

As is shown in detail below, the results of these tests are combined to determine if the token and one of the previously formed templates of the new voice message can become stored templates of a voice message that the recognizer is now trained to recognize, if the new voice messages is too similar to a voice message that the recognizer has been previously trained to recognize, or if the user should repeat the new voice message to form another token.

It should also be noted that at least two pronunciations of a new voice message are utilized by the training algorithm. The first time a new voice message is pronounced, it is converted into a token. The token is compared to the templates of the voice messages that the speech recognizer has been previously trained to recognize to obtain recognition scores, the first test is applied to the recognition scores, and the token is then stored as a template. The user is then prompted to say the new voice message a second time to form another token. The second and third tests are only used for the second and subsequent tokens of a new voice message. If the user is prompted to repeat the new voice message to form a new token, the previous token becomes one of the previously formed templates of the new voice message.

This training procedure provides a certain level of automatic control over the training process of a speaker dependent speech recognizer in what is an otherwise unsupervised environment. This training process prevents a user from adding a new voice message which is similar to a voice message the recognizer has previously been trained to recognize and insures a consistent pronunciation for all templates corresponding to the same voice message.

DETAILED DESCRIPTION OF THE INVENTION

Figure 1:
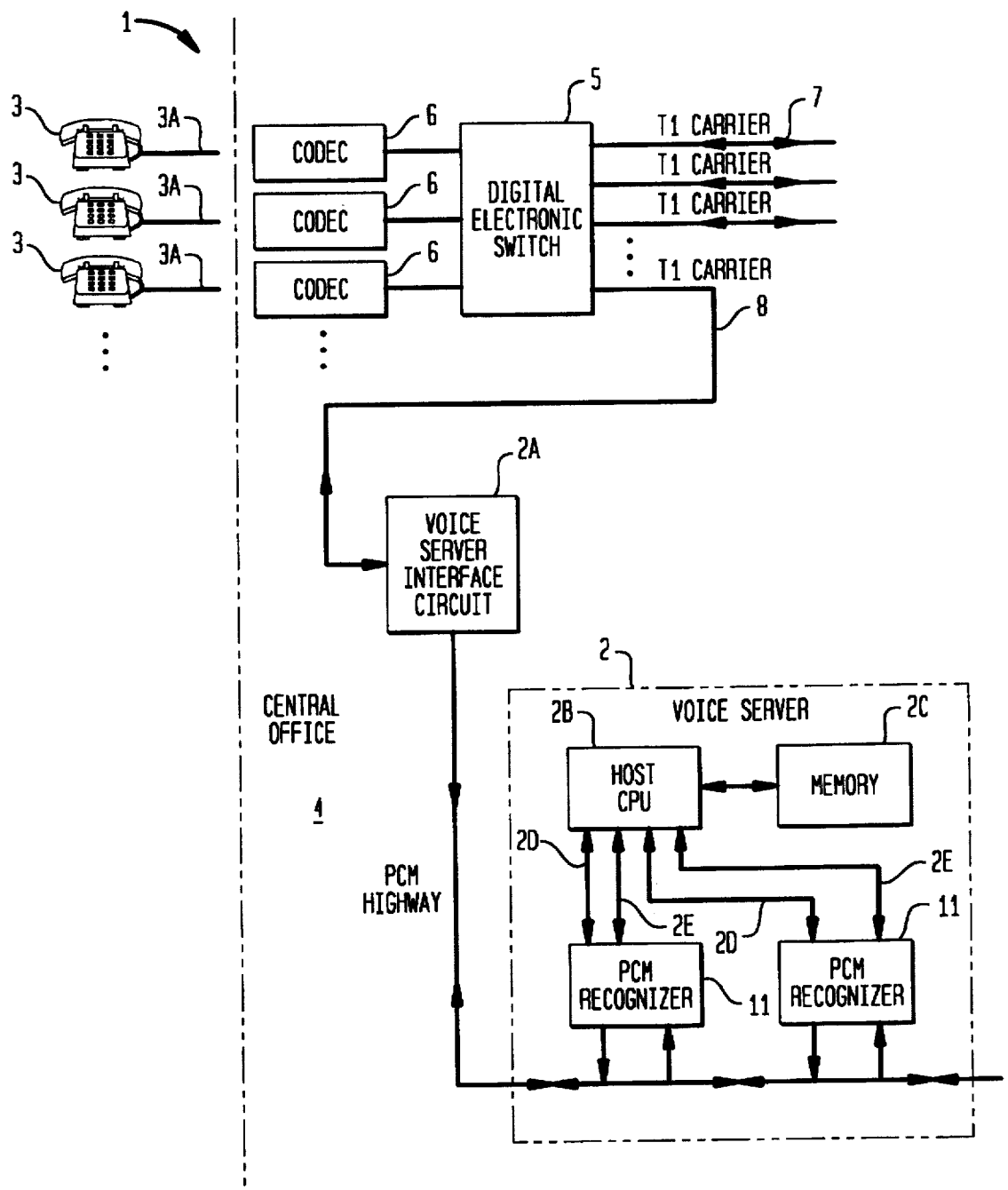
FIG. 1 schematically illustrates a speaker dependent isolated word speech recognizer for use in a telephone network.

FIG. 1 shows a telephone network 1 which includes a voice server 2. The voice server 2 is adapted to provide a variety of voice activated services to certain of the subscribers 3 served by the telephone network 1. The voice server 2 includes one or more PCM speech recognizers 11. The PCM recognizer 11 is described in greater detail in U.S. patent application Ser. No. 07/811,172, entitled "Recognizer for Recognizing Voice Messages in Pulse Code Modulated Format," filed for Priya Jakatdar on Dec. 19, 1991 and assigned to the assignee hereof. The contents of this application are incorporated herein by reference.

As shown, the voice server 2 communicates with a digital electronic switch 5 for providing call connections for the subscribers 3. The switch 5 is located in a telephone central office 4. At the central office 4, each of the subscriber lines or channels 3A is connected to the switch 5 through a coder/decoder (codec) 6.

Each codec 6 converts the analog voice message in the voice channel of its respective subscriber 3 to PCM digital form for coupling to the switch 5. Conversely, PCM digital signals containing voice messages from the switch 5 are converted to analog voice form by each codec 6 for coupling to the respective subscriber voice channel 3A.

In a typical network in which each analog voice message is a 4 KHz band-limited signal, each codec 6 samples an incoming analog voice message at a 8 KHz rate. Each sample, in turn, is then quantized to one of a number of signal levels, each of which is translated into a PCM signal of a specified number of bits and bit pattern. In a conventional network, each PCM digital signal indicative of a voice sample is a compressed signal consisting of 8 bits or one byte.

The electronic switch 5 assembles the PCM digital signals of the voice channels onto a number of time division multiplexed (TDM) carriers 7 for transmission and call connection. A typical so-called "T1 carrier" will carry 24 channels with associated signalling and control information.

In the telephone network 1 of FIG. 1, the switch 5 communicates with the voice server 2 over one or more preselected TDM carriers 8. These carriers are assigned to carry voice channels whose subscriber service plans include one or more of the voice actived services provided by the voice server 2.

As shown, each of these carriers is first coupled through a voice server interface circuit 2A which removes the above-mentioned usual telephone signalling and control information in the TDM carrier 8, as it is not needed by the server 2. The resultant PCM signals from the interface 2A contain the PCM digital signals of the voice message samples in the carried voice channels.

Each PCM signal is coupled to one or more of the PCM speech recognizers 11 included in the voice server 2. Each recognizer 11, in turn, is coupled through respective data and address busses 2D and 2E to the host CPU 2B of the voice server 2. The voice server 2 also includes a memory unit 2C which can include RAM, ROM and disk storage and which is coupled to the host CPU 2B.

To carry out its voice activated services, the voice server 2 communicates with each of the voice channels 3A having access to the server using prompts and stored voice messages which are generated by the host CPU 2B and memory 2C. The prompts and stored voice messages for a particular voice channel 3A are coupled through the respective recognizer 11 onto the channel for return to the subscriber through the interface 2A, switch 5 and respective codec 6.

The subscriber 3, upon receipt of the recorded voice messages and prompts, provides a voice message response on its channel 3A. This voice message response is received at the respective voice recognizer 11 in PCM digital signal form corresponding to samples of the message. The recognizer 11 then carries out a recognition process in which it attempts to recognize the voice message from the PCM digital signals.

Thereafter, the recognizer 11 provides a signal to the host CPU 2B which, depending upon the signal, takes appropriate action to continue the voice service being accessed. This action might be an instruction to the switch 5 to make a particular connection for the voice channel, if the voice accessed service is an auto-dialing service and the recognition results identify a particular number being called. It might also be the supply by the CPU 2B of further prompts and recorded voice messages to the voice channel, if a valid recognition has not been made and a repeat of the voice message response is required.

Figure 2:
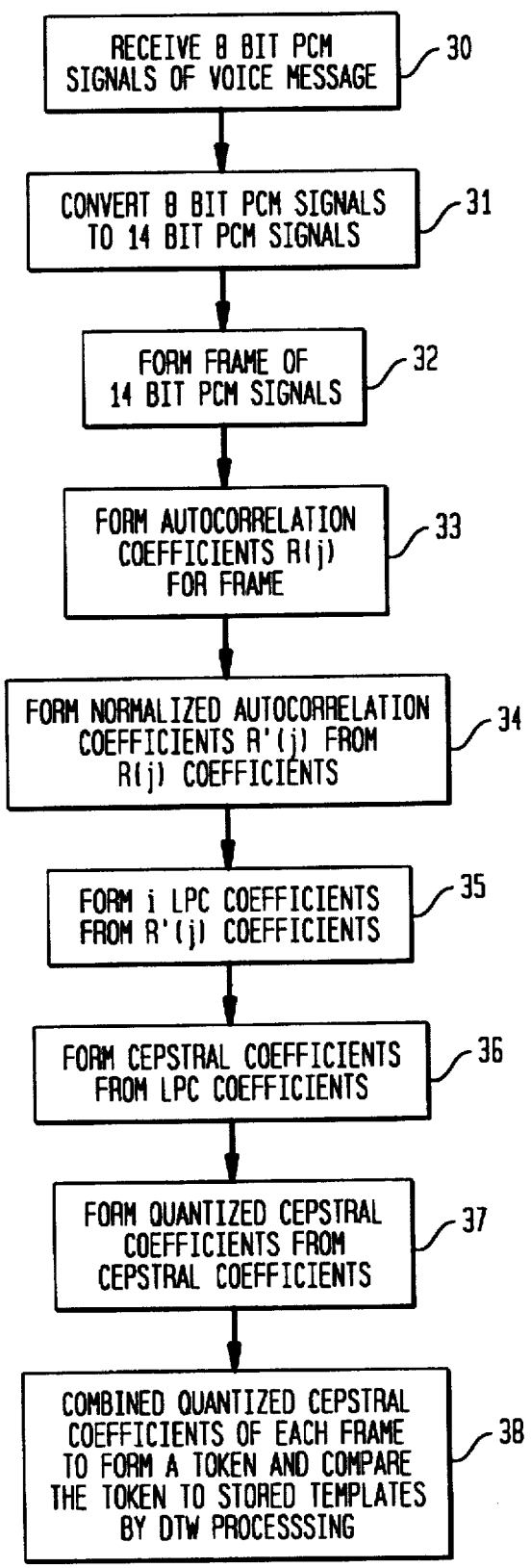
FIG. 2 describes the process by which 8-bit PCM signals of a voice message are converted to a token comprised of cepstral coefficients.

Each recognizer 11 performs recognition processing of a voice message on a channel using statistical digital signal processing of the incoming PCM digital signals representing the voice message samples. This processing is illustrated in FIG. 2.

Each 8 bit PCM digital signal when received at the recognizer (step 30) is first transformed into a 14 bit linear PCM signal (step 31). The 14 bit PCM signals as they are formed are then assembled into frames (step 32), each frame containing a given number N of signals (e.g., 240 signals). Each frame is then processed separately when it is formed.

The statistical processing of each frame involves first forming a number of (e.g., 10) autocorrelation coefficients (step 33) by multiplying the PCM digital signals in the frame with each other in accordance with the formula:

$$R(j) = \sum_{k=1}^{N=240} x(k+j)x(k),$$

where $j = 0-9$.

As can be appreciated, the R(0) autocorrelation coefficient represents the sum of the squares of the PCM digital signals in a frame. Hence, R(0) is a measure of the energy contained in these signals and, thus, the energy contained in the samples of the voice message over the frame. As can be also appreciated, the coefficients R(j) will contain a larger number of bits then the individual PCM signals x(j) and x(k+j) and for the bit numbers given will consist of up to 36 bits. To make it easier for the recognizer 11 to carry out the further statistical digital processing required, the autocorrelation values R(j) are redefined or normalized (step 34) to 16 bit coefficients R'(j).

The normalized autocorrelation coefficients R'(j) are then used in standard fashion to form a number of (e.g., 10) linear predicative coding (LPC) coefficients also of 16 bits each (step 35). The latter coefficients are then further processed to form a number of (e.g., 10) 16 bit cepstral coefficients (step 36). The cepstral coefficients are then quantized to form a number of (e.g., 10) quantized cepstral coefficients of 4 bits each (step 37).

The quantized cepstral coefficients for each frame of a voice message are grouped or combined together to define a token for the voice message (step 38). Each token is then compared to templates previously formed in one or more training sessions by the subscriber on the given voice channel. These templates define a predetermined set of voice messages of the subscriber which are desired to be later recognized when the subscriber uses the services of the voice server 2 of FIG. 1.

During the training session, each of these voice messages is repeatedly spoken by the subscriber and the resultant PCM digital signals undergo similar processing as described above to form quantized cepstral coefficients which comprise the aforementioned templates.

Comparison of each token with the previously formed voice message templates is carried out by known dynamic time warp (DTW) processing. (DTW processing is described in greater detail in F. Itakura, "Minimum Prediction Residual Principle Applied to Speech Recognition," IEEE Transactions on Acoustic Speech & Signal Processing, vol. ASSP-23, p. 67–72, Feb., 1975; H. Sakoe and S. Chiba, "Dynamic Programming Algorithm Optimization for Spoken Word Recognition," IEEE Transactions on Acoustic Speech & Signal Processing, vol. ASSP-26, No. 1, February, 1978.) The result of the comparison of a token with each template is a recognition score, with the smaller the recognition score the better the match between the token and the template.

Figure 3A:
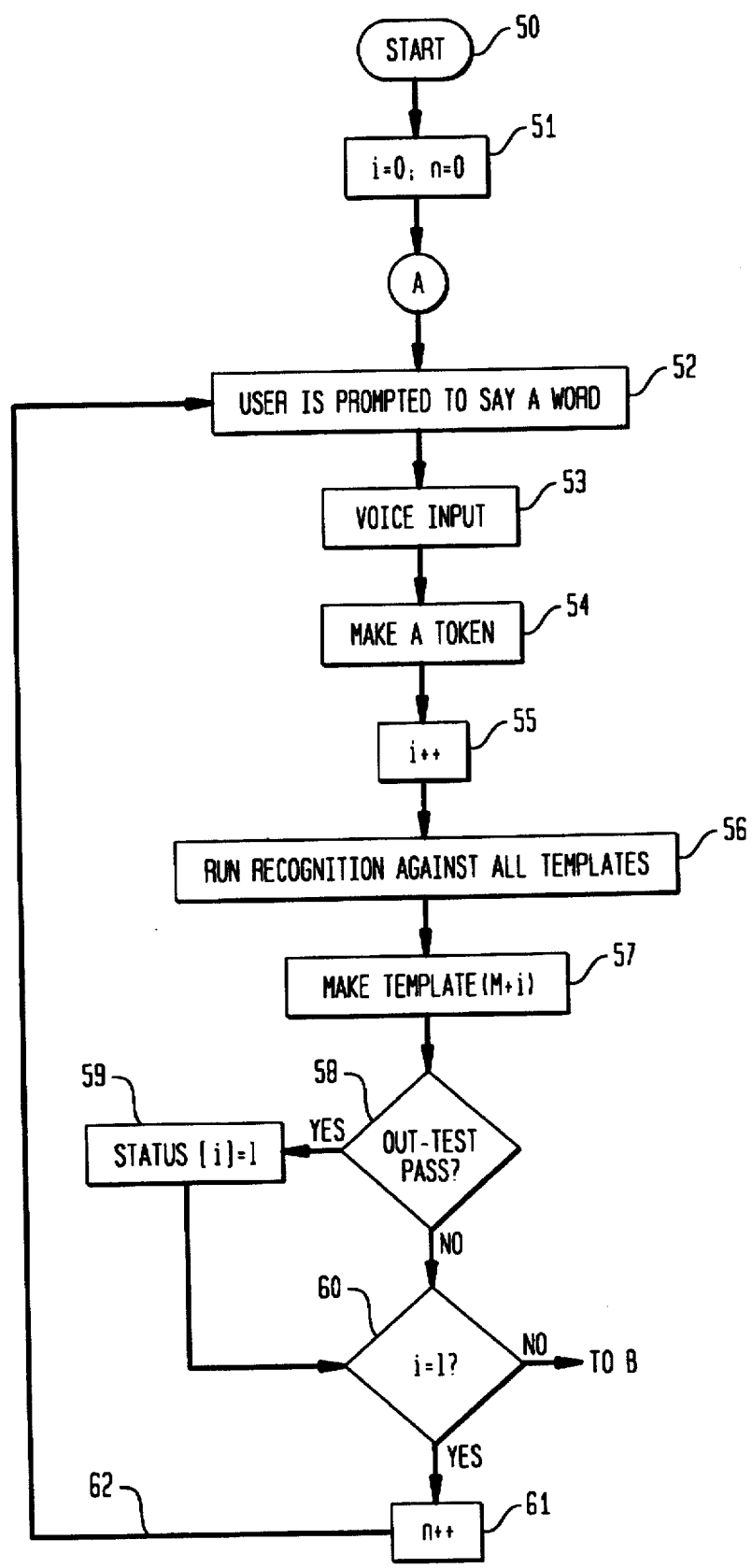
FIG. 3A and FIG. 3B show a flowchart of a training algorithm for use in a speech recognizer, such as the speech recognizer of FIG. 1, in accordance with the present invention.
Figure 3B:
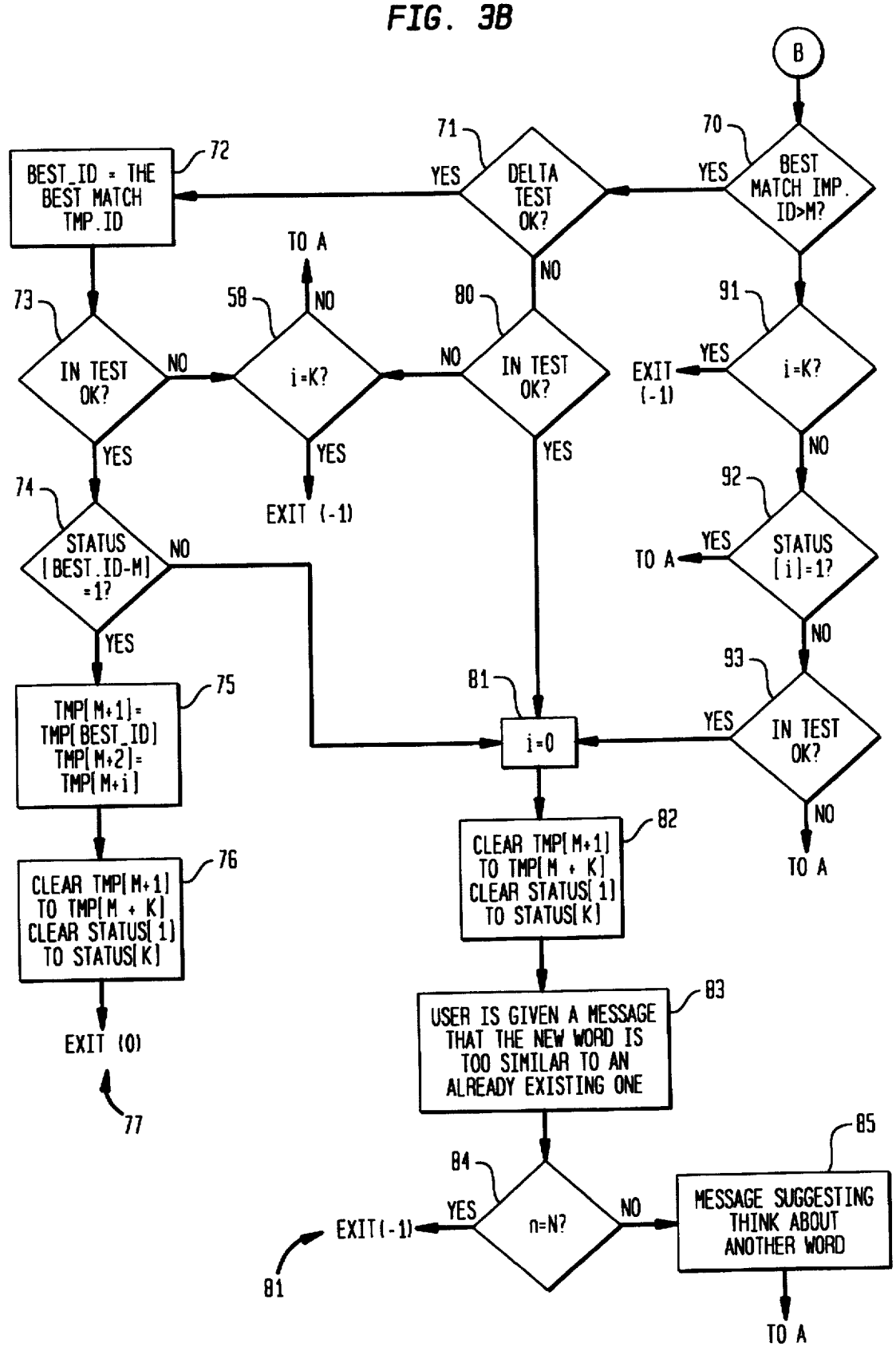

FIG. 3A and FIG. 3B show a flowchart of a training algorithm used by a speech recognizer 11 of FIG. 1. In order to utilize the training algorithm of FIGS. 3A and 3B it is necessary to make use of certain templates previously formed and now stored by the recognizer. These previously formed templates 40 are illustrated in FIG. 4.

In general, to train the recognizer to recognize a new voice message, the user is prompted to speak the new voice message a plurality of times, e.g., a maximum of K times. Each time the user speaks the new voice message, a token is formed using the processing steps described above in connection with FIG. 2. The token 42 formed at the $i^{th}$ repetition of the new voice message is illustrated in FIG. 4.

Figure 4:
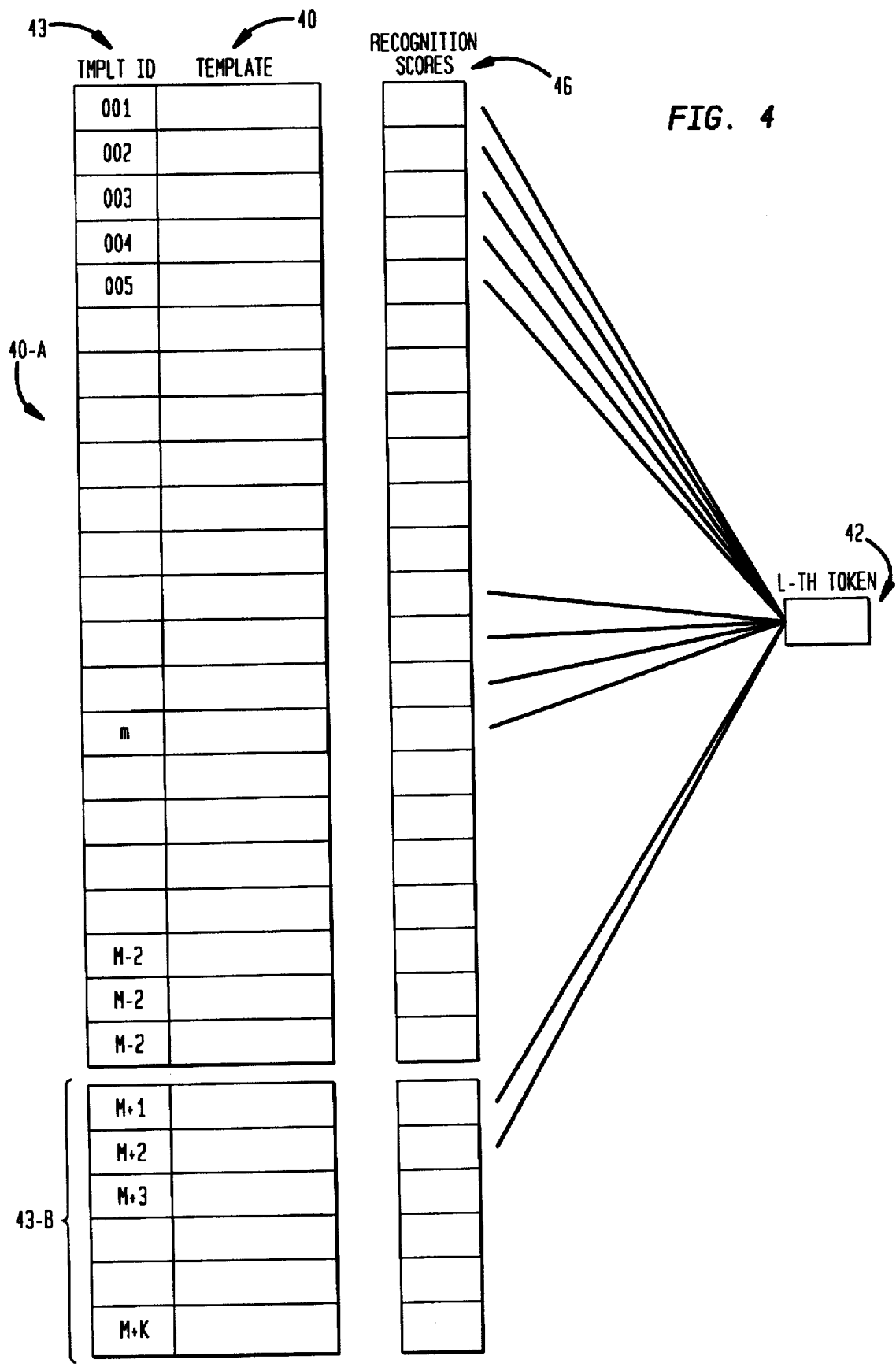
FIG. 4 schematically illustrates the templates which are stored by the speech recognizer of FIG. 1.

As shown in FIG. 4, each template 40 has a template identification number (tmplt.id) 43. The templates 40 fall into two groups. The first group 40-A comprises templates corresponding to voice messages the recognizer has been previously trained to recognize. There may be a maximum of M such templates, but as indicated by the shading only m such templates currently exist. The templates in the group 40-A have the identification numbers 001, 002, . . . , m, . . . ,M-2, M-1,M. The second group 40-B of templates comprises templates formed using the new voice message. Up to K templates formed from K repetitions of the new voice message may be stored. For the example shown in FIG. 4, i=3, i.e. the token 42 corresponds to the third repetition of the new voice message. Thus, there are two previously stored templates of the new voice message with identification numbers M+1 and M+2. According to the training algorithm to be described in detail below in connection with FIGS. 3A and 3B, the token 42 corresponding to the repetition i=3 will become the template with the identification number M+3.

Using the DTW processing, the $i^{th}$ token 42 is compared with all of the existing templates 40. The result is a recognition score 46 for each template 40. As indicated above, the smaller the recognition score the better the match between token and the template.

Three tests are used in the training algorithm. These test are as follows:

1. The first test is the OUT-TEST. This test is considered passed if the best (smallest) recognition score of the new token against all already existing templates of voice messages that the recognizer has been previously trained to recognize (group 40-A) is greater than a preset variable OUTHRESH.
2. The second test is the DELTA-TEST. This test is considered passed when the difference between the best recognition score of the new token against the templates of voice messages the recognizer has been previously trained to recognize (group 40-A) and the best recognition score of the new token against templates previously formed from the new voice message (group 40-B) is greater than a preset variable DELTATHRESH.
3. The third test is the IN-TEST. This test is considered passed when the best recognition score of the new token against templates previously formed from the new voice message (group 40-B) is smaller than a preset variable INTHRESH.

The training algorithm of FIG. 3A and FIG. 3B is now considered in greater detail. This training algorithm uses the following variables M—maximum number of templates of voice messages the recognizer can be trained to recognize m—the number of existing templates of voice messages the recognizer has been previously trained to recognize at the time of training for a new voice message n—current pass number N—maximum number of passes allowed, with each pass being terminated because of similarity between the new voice message and an already existing voice message (Thus, N is related to the number of new voice messages for which the user is allowed to attempt training)

i—attempt number (i.e., repetition number of the new voice message) within the current pass K—maximum number of attempts within one pass The variables M, K and N, as well as the number of templates stored for each recognized voice message (e.g., two) are usually dependent upon user interface requirements and system capacity.

Turning to FIG. 3A, the training process for a new voice message is as follows. The process starts (step 50) by initializing the variables i and n to i=0 and n=0 (step 51). The user is then prompted by the recognizer (e.g., a recognizer 11 of FIG. 1) to say a new voice message (step 52). The user speaks the desired new voice message and the voice input is inputted to the recognizer (step 53). The new voice message is then formed into a token (step 54) in accordance with the process of FIG. 2. The variable i is then incremented by one (step 55). The token is then compared to all existing templates (Groups 40-A and 40-B of FIG. 4) using DTW processing and a recognition score obtained for each already existing template (step 56). The token is then stored as a template in the group 40-B of FIG. 4 with the identification number M+i (step 57). The OUT-TEST is then applied to the recognition scores (step 58). If the OUT-TEST is passed the status bit status[i] is set to one (step 59). If i=1 (step 60), the variable n is incremented by one (step 61) and control returns via path 62 to step 52. If i does not equal one, control is transferred via path 63 to point B in FIG. 3B.

Thus, if i=1, i.e. for the first repetition of the new voice message, all that is done is to form a token, obtain the recognition scores for the token with respect to all pre-existing templates, store the token as a template, and determine if the OUT-TEST is passed. Then the user is prompted to repeat the new voice message. Because the training algorithm of FIGS. 3A and 3B is designed for use with a recognizer wherein two templates are stored for each recognized voice message, no conclusion can be reached after the first attempt (i=1) with a new voice message as to whether a template for the new voice message can be stored for subsequent recognition or whether the new voice message is too close to a voice message that the recognizer has been previously trained to recognize.

For the case i≧2 (which means that there is at least one template previously formed from the new voice message) control transfers to point B of FIG. 3B.

In FIG. 3B, it is first determined (step 70) if the best match score for the current token was obtained with a preexisting template with a template identification number (tmp.id) greater than M (i.e. with a previously formed template of the new voice message belonging to the group 40-B of FIG. 4). If the answer is yes, the DELTA-TEST is performed on the recognition scores of the current token (step 71). If the DELTA TEST is passed (meaning that the current token is more similar to a previously formed template of the new voice message than to a template of a previously trained voice message), the variable best_id is set to the template identification number of the template that resulted in the best recognition score with the current token (step 72). The IN-TEST is then applied to the recognition scores of the current token (step 73). If the IN-TEST is passed (meaning that the current token is similar to a template previously made with the new voice message so that there is consistency of pronunciation), it is determined (step 74) if the best_id template passed the OUT-TEST at the time it was a token. This is accomplished by examining the status bit status [best_id-M] to see if it equals one. If the answer is yes, it means the current token and the best_id template become two templates for a new voice message which can now be recognized by the recognizer.

The template tmp[best_id] (where tmp[j] means the template with identification number j) is now given the identification tmp[m+1] and the template tmp[m+i], i.e., the current token, is now given the identification tmp[m+2] (step 75). In other words, the two accepted templates are moved from group 40-B to group 40-A in FIG. 4 with the new identification numbers m+1 and m+2. The remaining group 40-B templates (tmp[M+1] to tmp[M+K]) are cleared from the system and the status bits, status[i=1] to status[i=K], are also cleared (step 76). The user now exits from the training process in accordance with the EXIT(0) step (step 77).

Suppose that at step 71, the DELTA-TEST is not passed (meaning that the current token is too close to a template of a message for which the recognizer has already been trained). In this case, the IN-TEST is applied (step 80). If the IN-TEST is passed, the variable i is set to zero (step 81). The templates made during the previous attempts with new voice message are cleared and the status bits are cleared (step 82). The user is then given a message that the new voice message is too similar to an already existing voice message (step 83). If the variable n is less than N (i.e., the number of passes is less than the maximum permitted) (step 84), the user is given a message to think about a different new voice message (step 85) and control returns to point A in FIG. 3A. If n=N, the training process terminates unsuccessfully in accordance with the EXIT(−1) step (i.e, step 86).

If the IN-TEST at step 80 is not passed or the IN-TEST at step 73 is not passed, the result is inconclusive, i.e., it cannot be said that the recognizer has been successfully trained for the new voice message, but it also cannot be said that the new voice message is too close to a voice message for which the recognizer has previously been trained. Thus, control passes to step 90. If i<K, control returns to point A and user is prompted to repeat the new voice message. If i=K, the training process terminates unsuccessfully in accordance with the step EXIT(−1).

Returning now to step 74, if the status bit status [best.id-M] does not equal 1, control is transferred to step 81 and the steps 82, 83, 84, and 85 or 86 are followed.

Returning now to point B, if when obtaining the recognition scores of the current token against all existing templates, the best score is obtained with a template whose identification number is smaller than or equal to M (i.e., with a template of a previously trained voice message belonging to group 40-A in FIG. 4) control transfers to step 91. Again the result is inconclusive. If i=K, the training process terminates in accordance with the step EXIT(−1). If i<K it is determined if the status bit of the current token status[i] is equal to 1 (step 92), i.e., it is determined if the current token passed the OUT-TEST. If the OUT-TEST is passed (meaning that the current token is not too close to any pre-existing template), control is returned to point A, and the user is prompted to repeat the new voice message. If the OUT-TEST is not passed (meaning the current token is too close to a pre-existing template), the decision as to how to proceed is made by the IN-TEST (step 93). If the IN-TEST is not passed (meaning that the current token is not very close to a pre-existing template made with the new voice message) control is returned to point A and the user is prompted to repeat the new voice message. If the IN-TEST is passed (meaning that the current token is close to a pre-existing template made with the new voice message) control is passed to the step 81 and the steps 82, 83, 84, and 85 or 86 are followed, i.e., the user is prompted to think of a different new voice message for training.

In short, a process for training a speaker dependent isolated word speech recognizer has been disclosed. The process provides constraints on the user, who would otherwise operate the training process in an unsupervised environment. The constraints insure that new voice messages which are too close to voice messages for which the recognizer has already been trained are not added. The constraints also insure that a consistent pronunciation of a new voice message is used so that the different templates formed for a new voice message are sufficiently similar.

Finally, the above-described embodiments of the invention are intended to be illustrative only. Numerous alternative embodiments may be devised by those skilled in the art without departing from the scope of the following claims.

I claim:

1. A process for training a speaker dependent speech recognizer to recognize a new voice message comprising the steps of, (a) converting a new voice message spoken by a user into a token, (b) comparing said token to a plurality of templates stored in said recognizer to obtain a recognition score for each of said templates, said templates comprising templates of voice messages said recognizer has been previously trained to recognize, and one or more previously formed templates of said new voice message, (c) applying first, second and third tests to said recognition scores to determine if said token and one of said previously formed templates of said new voice message can become templates of a voice message now recognized by said recognizer, if said new voice message is too close to one of said voice messages said recognizer has been previously trained to recognize, or if said user should repeat said new voice message to form another token, wherein said first test comprises determining if the best of said recognition scores is greater than a first predetermined threshold, said second test comprises determining if the difference between the best of said recognition scores with respect to templates of voice messages said recognizer has been previously trained to recognize and the best of said recognition scores with respect to said one or more previously formed templates of said new voice message is greater than a second predetermined threshold, and said third test comprises determining if the best of said recognition scores with respect to said one or more previously formed templates of the new voice message is smaller than a third predetermined threshold.

2. The process of claim 1 wherein at least first and second successive tokens of said new voice message are formed, wherein said first token is compared to the templates of the voice messages said recognizer has been previously trained to recognize to obtain recognition scores, wherein the first test but not the second and third tests is applied to the recognition scores of the first token, and wherein when the second token of said new voice message is formed, said first token is a previously formed template of said new voice message.

3. A process for training a speaker dependent speech recognizer comprising the steps of (a) converting a new voice message spoken by a user into a token, (b) comparing said token to a plurality of templates stored in said recognizer to obtain a recognition score for each of said templates, said templates comprising templates of voice messages said recognizer has been previously trained to recognize and one or more previously formed templates of said new voice message, (c) testing said recognition scores to determine if said new voice message is too similar to a voice message said recognizer has been previously trained to recognize, if said user is not using sufficiently consistent pronunciation in successive pronunciations of said new voice message, or if said speech recognizer can now recognize said new voice message.

4. The method of claim 3 wherein said testing step comprises determining if the difference between the best of said recognition scores with respect to said templates of said voice messages said recognizer has been previously trained to recognize and the best of said recognition scores with respect to said one or more previously formed templates of said new voice message is greater than a predetermined threshold, and determining if the best of said recognition scores with respect to the one or more previously formed templates of the new voice message is smaller than another predetermined threshold.

5. The method of claim 4 wherein said testing step further comprises determining if the best recognition score with respect to all of said templates is greater than a predetermined threshold.

6. A process for training a speaker dependent speech recognizer comprising the steps of:

(1) prompting a user to speak a new voice message that the user currently desires the recognizer to be trained to recognize for the $i^{th}$ time, $i \geq 2$, (2) converting said new voice message spoken for the $i^{th}$ time into a new token, (3) comparing the new token to templates of voice messages that the recognizer has been previously trained to recognize and one or more previously formed templates of the new voice message to obtain a recognition score of the token with respect to all of said templates, (4) storing the new token as a template, (5) applying a first test which is passed if the best of said recognition scores is greater than a first threshold (6) determining if the best recognition score was obtained with a template of a voice message the recognizer has been previously trained to recognize or with a previously formed template of the new voice message, (7) if the best recognition score was obtained with a previously formed template of the new voice message, (a) applying a second test which is passed if the difference between the best recognition score made with a template of a voice message the recognizer was previously trained to recognize and best recognition score made with a previously formed template of said new voice message exceeds a second threshold, (b) performing a third test which is passed if the best recognition score falls below a third threshold, (c) if said second and third tests are passed and if the template which produced the best recognition score passed the first test at the time it was the token, then said new token and said template with said best recognition score are stored as first and second templates of the new voice message, which new voice message can now be recognized by said recognizer (d) if said second test is not passed and said third test is passed, or if said second and third tests are passed but said template with the best recognition score has not passed the first test at the time it was a token, prompting the user with a message that the new voice message is too similar to a voice message that the recognizer has been previously trained to recognize.

7. The process of claim 6, further comprising the step of:

if the best recognition score was obtained with a template of a voice message that the recognizer has been previously trained to recognize and if said first test was not passed and if said third test was passed by said new token, prompting the user with a message that the new voice message is too similar to a voice message that the recognizer has been previously trained to recognize.

8. The process of claim 6, further comprising the step of:

if the best recognition score was obtained with a previously formed template of a new voice message, and the second test is not passed and the third test is not passed, or the second test is passed and the third test is not passed, returning to step (1) so long as i is below a maximum limit.

9. The process of claim 6, further comprising the step of:

if the best recognition score was obtained with a template of a voice message that the recognizer has been previously trained to recognize, and if said first test was passed, returning to step (1) so long as i is below a maximum limit.

10. The process of claim 6, wherein for the case i=1, the process comprises the steps of:

prompting the user to say the new voice message, converting said new voice message into a token, comparing the token to stored templates of voice messages that the recognizer has been previously trained to recognize to obtain a recognition score with respect to all of these templates, storing the token as a template, applying said first test which is passed if the best of said recognition scores is greater than said first threshold, and prompting the user to say the current voice message again.

\* \* \* \* \*